United States Patent [19]

Fehlner et al.

[11] 4,067,315

[45] Jan. 10, 1978

[54] SOLAR HEAT PIPE

[75] Inventors: Francis P. Fehlner; Ugur Ortabasi, both of Corning, N.Y.

[73] Assignee: Corning Glass Works, Corning, N.Y.

[21] Appl. No.: 625,650

[22] Filed: Oct. 24, 1975

[51] Int. Cl.² .................................................. F24J 3/02

[52] U.S. Cl. ...................................... 126/271; 165/105

[58] Field of Search ............... 126/270, 271; 237/1 A; 165/105

[56] References Cited

U.S. PATENT DOCUMENTS

| | | | |
|---|---|---|---|
| 2,460,482 | 2/1949 | Abbot | 126/271 |
| 3,799,144 | 3/1974 | Ramsey et al. | 126/270 |
| 3,875,926 | 4/1975 | Frank | 126/271 |
| 3,923,038 | 12/1975 | Cutchaw | 126/271 |

FOREIGN PATENT DOCUMENTS

| | | | |
|---|---|---|---|
| 282,819 | 10/1971 | U.S.S.R. | 126/271 |

*Primary Examiner*—Kenneth W. Sprague

*Attorney, Agent, or Firm*—Burton R. Turner; Clarence R. Patty, Jr.

[57] ABSTRACT

A heat pipe for converting solar energy into thermal energy comprising an envelope provided with an evaporator region and a condensor region, a quantity of vaporizable working fluid within the envelope, a wick within the envelope having capillary means for transporting the working fluid, and, preferably, evacuated transparent container means surrounding the evaporator region for insulating the evaporator region. The evaporator region of the heat pipe is made from a material which is substantially transparent to radiation in a selected range of the solar spectrum, and a wick therewithin which substantially absorbs radiation in at least a portion of the range of the solar spectrum transmitted through the evaporator region. Solar energy is thereby converted into thermal energy or heat directly within the wick, and the heat generated within the wick causes portions of the working fluid therein to evaporate.

6 Claims, 7 Drawing Figures

R
Q
ENV
W
V
E
C
VAPOR FLOW
CONDENSATE RETURN

SOLAR HEAT PIPE

BACKGROUND OF THE INVENTION

The present invention relates to heat pipes, and more particularly to an improved heat pipe adapted for use in converting solar energy into thermal energy or heat.

Heat pipes adapted to transfer heat from one area of heat input to another area of heat dissipation have long been known in the art. Because of their high efficiency in transferring relatively large quantities of heat with small temperature gradients, heat pipes have been used to absorb solar energy, convert the solar energy into thermal energy or heat, and transfer the heat to a heat transfer or storage fluid. An example of a prior art solar heat pipe is shown and described in an article entitled, "Research Applied to Solar Systems", pages 1-18 of "Proceedings of the Solar Thermal Conversion Workshop", Arlington, Va., Jan. 11-12, 1973, sponsored by the National Science Foundation Grant GI-32488.

The known type of heat pipe adapted for use in converting solar energy into thermal energy is shown schematically in FIG. 1. A hermetically sealed chamber or envelope ENV of tubular form has evacuated therefrom all noncondensable gases. The envelope is made from a heat-conductive material, more specifically from metal, and has an outer surface portion provided with a coating for absorbing solar radiation. The portion of the envelope adapted to absorb solar energy comprises an evaporator region E. The envelope has another portion in contact with a heat transfer fluid or medium adapted to remove the heat generated in and delivered from the evaporator region, such portion being known as a condensor region C.

The interior of the envelope ENV normally contains a wick W along its entire length which comprises a cylindrical cluster of wires, glass fibers, or cloth, or a hollow porous powdered or ceramic body, or a radially extending, equally spaced plurality of fins or threads spirally extruded or formed on the interior wall of the envelope. In the evaporator region of the envelope, the wick W is saturated with a working fluid. The wick W surrounds or is provided with a central vapor duct or free space V, which is shown to be centrally located within the wick; and, when solar radiation is not being applied to the evaporator region, the vapor duct V contains only the vapor of the working fluid at a pressure which corresponds to the saturation pressure of the fluid at an isothermal temperature.

When solar energy, in the form of rays R, is absorbed by the coated outer surface of the evaporator region E, the outer extent of the envelope is heated by the transformation of radiation in at least a portion of the visible range of the solar spectrum to lattice vibrations in the solid outer surface i.e. heat. The heat is thereafter thermally conducted through the wall of the envelope and into the wick.

The conducted heat is absorbed by the working fluid and this causes a portion of the working fluid to evaporate. The resulting vapor is at a substantially higher pressure and migrates through the vapor duct V toward the cooler condensor region C, at the other end of the envelope ENV. A heat transfer or storage fluid is pumped or directed to flow over the outer surface of the condensor region C of the envelope. The vapor condenses on the inner wall of the envelope at the condensor region; and as the vapor condenses, it gives up heat in the condensor region, which was acquired earlier during vaporization in the evaporator region. The heat output is represented by arrows Q.

The wick W is provided with capillary-sized vessels for pumping or conveying the condensed working fluid from the condensor region C to the evaporator region E. Although it may be possible to convey the condensate solely by capillary action within the wick, heat pipes used for solar energy conversion are of such length that it has been found preferable to incline the evaporator region E downwardly relative to the condensor region C to gravitationally augment the flow of the condensate. With such inclination, a substantial portion of the condensate flows through a lower portion of the vapor duct and is distributed transversely by capillary action within the evaporator region E into those portions of the wick from which the working fluid has evaporated.

The phase transformation of working fluid from its liquid state to its vapor state and back again and the capillary transport of the working fluid will continue as long as the evaporator region E receives a substantial amount of solar radiation.

As previously stated, the known type of heat pipe used to absorb and convert solar energy has used an envelope made from metal and has relied upon the absorption of solar energy in the outer surface of the evaporator region and the conduction of heat from the outer surface inwardly through the envelope wall. A shortcoming of such heat pipes is that some of the heat generated in the outer surface will be lost by virtue of the thermal resistance of the wall of the envelope and of the interface between the wall and the wick.

To reduce the temperature drop across the wall, it is possible to reduce the wall thickness of the metal envelope. However, the pressure of the vapor developed within the envelope and temperatures generated within the envelope wall provide substantial limitations on the minimal wall thickness. That is, the wall must be thick enough to withstand creep or deformation at high temperatures and internal pressures. It is possible to select working fluids which develop lower vapor pressures, but the field of choice of fluids is limited by their chemical stability and chemical compatibility with the wick and wall materials, phase transition temperatures, and also by their heat of vaporization.

It is also well known that the envelope may be made from materials which have high thermal conductivity. However, many envelope materials having high thermal conductivity are difficult to form or fabricate at long lengths suitable for solar absorption and conversion. For example, it is relatively difficult to form durable, leak-proof seals between tubular sections of such materials and also between tubular sections and end caps made from such materials. Moreover, the choice of envelope materials is restricted by the requirement that the envelope, the wick, and the working fluid be compatible at high operating temperatures. For example, the materials must be chosen to avoid the possibility of galvanic corrosion and the formation of non-condensable gases.

An object of the present invention is to provide an improved heat pipe applicable for use in converting solar energy into heat energy which eliminates the shortcomings or problems associated with conventional heat pipes.

It is yet another object of this invention to provide an improved heat pipe device which is capable of being mass-produced from low cost materials and yet which has a durability at least equivalent to conventional solar heat pipe devices. It is a further object of the present invention to provide a heat pipe device which is subject to minimal convective, conductive, and emissive heat losses.

SUMMARY OF THE INVENTION

The improved heat pipe of the present invention is of the general type which includes an elongated hermetically sealed envelope, a quantity of vaporizable working fluid within the envelope, and a wick within the envelope having capillary means for transporting the working fluid. The envelope has a solar radiation input or evaporator region and a heat output or condensor region.

The present invention contemplates a new and useful improvement of the prior art solar heat pipe, wherein solar radiation is transmitted through an evaporator region of the envelope and is absorbed directly by the wick therein. The envelope at the evaporator region is made from a material, such as glass, which is substantially transparent with respect to radiation in a selected range of the solar spectrum, thereby permitting such radiation to be substantially transmitted therethrough. At least an outer surface portion of the wick which is contained within the evaporator region is absorptive of radiation in at least a portion of the range of the solar spectrum to which the evaporator region or wall portion is substantially transparent. Solar radiation absorbed by the wick is transformed within the wick into lattice vibration or heat, and such heat is transferred directly to the working fluid, thus causing the working fluid to evaporate.

The evaporator region of the envelope is preferably insulated from the ambience by an evacuated glass jacket which is hermetically sealed to the envelope in the vicinity of the juncture between the evaporator and condensor regions. To reduce emissive heat losses, an infrared reflective coating may be applied either to the outer surface of the heat pipe envelope at the evaporator region thereof, and/or to the inner or outer surface of the insulating jacket.

BRIEF DESCRIPTION OF THE DRAWINGS

The invention will be further described with reference to the accompanying drawings given by way of example, and in which.

DESCRIPTION OF THE PREFERRED EMBODIMENTS

Referring now to FIGS. 2–7 of the drawings, there is illustrated an improved heat pipe of the general type which includes an elongated, hermetically sealed envelope ENV, preferably of cylindrical tubular form, a quantity of vaporizable working fluid within the envelope ENV, and a capillary wick W within the envelope ENV having vessel means for transporting the working fluid by capillary action. The envelope ENV has an evaporator or solar radiation input region or wall portion E for receiving solar radiation and a condensor region or wall portion C adapted to dissipate heat energy into a heat sink, such as a heat transfer or storage fluid, or other medium having defined heat transfer characteristics for taking up heat generated at the outer surface of the envelope forming the condensor region C.

Figure 1:
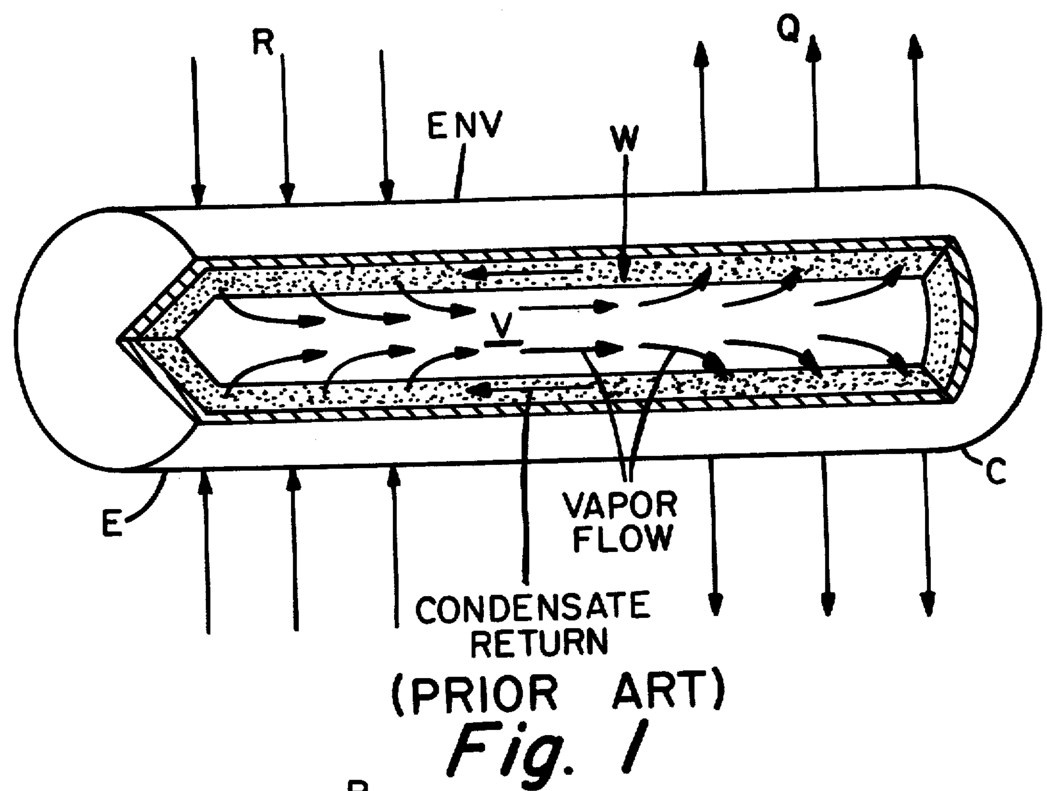
FIG. 1 is a schematic view depicting the operation of a conventional solar heat pipe having a selective coating on an outer surface of a radiation input or evaporator region of the envelope of the heat pipe.
Figure 2:
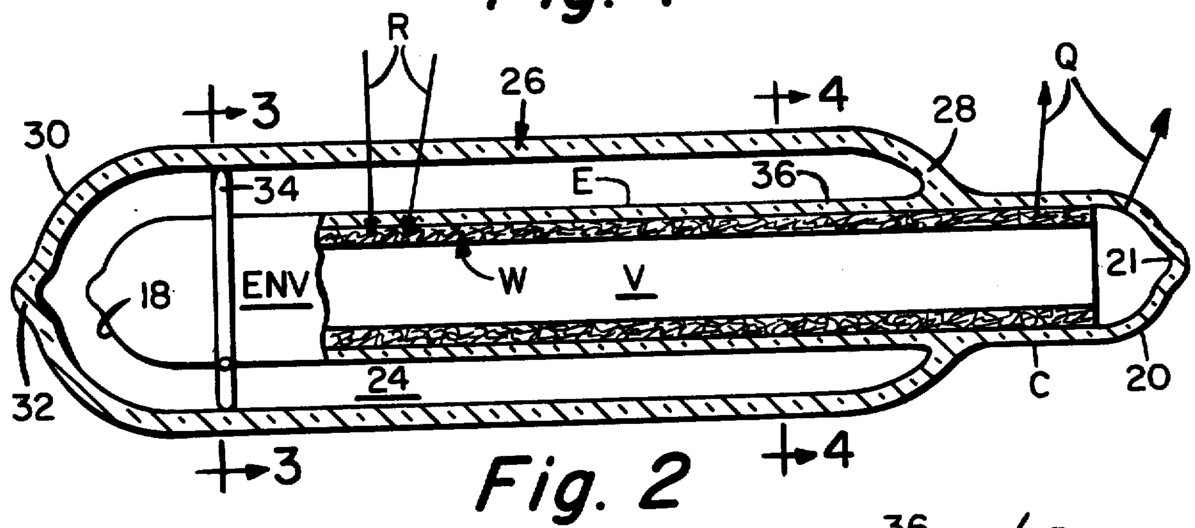
FIG. 2 is a side elevational view in partial cross-section of a preferred embodiment of the improved solar heat pipe of the present invention.
Figure 3:
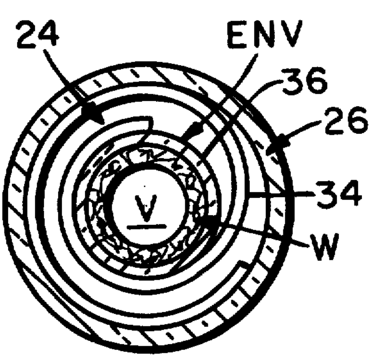
FIG. 3 is a sectional view taken on line 3—3 of FIG. 2.
Figure 4:
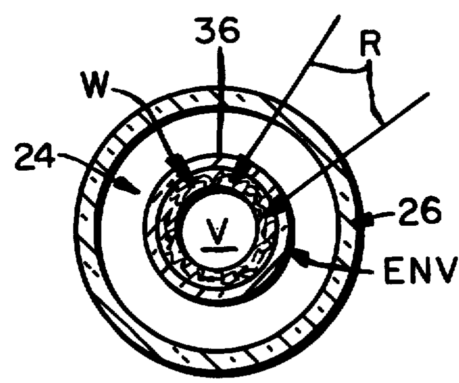
FIG. 4 is a sectional view taken on line 4—4 of FIG. 2 and illustrates the operation of the evaporator region of the improved solar heat pipe of the present invention.

In a first embodiment of the improved heat pipe of the present invention illustrated in FIGS. 2–4, the envelope ENV is wholly made from a material which is substantially transparent to radiation in a selected range of the solar spectrum, such as a portion of the visible range. The wick W has at least an outer surface portion adapted to absorb radiation in at least a portion of such selected range of the solar spectrum. In contrast with the prior art heat pipes used for solar conversion, solar radiation is transmitted through evaporator wall portion E of the envelope ENV, rather than being absorbed on the outer surface thereof; and the solar radiation is absorbed and transformed into lattice vibrations or sensible heat directly within the wick W, rather than being transformed into heat in an outer surface portion of the envelope, with the heat being thereafter transferred by thermal conduction through the envelope to the wick.

As shown in FIGS. 2 and 3, the wick W may extend from near a first closed end 18 of the envelope ENV to near a second closed end 20 of the envelope. That is, the capillary wick W extends generally throughout both the evaporator and condensor regions E and C. The wick W is shown to be of a hollow thin-walled cylindrical form and to have a central vapor duct V formed therein extending from one end to the other end of the wick W. The vapor duct, surrounded by the wick, provides free space means for directing the movement of vaporized working fluid or vapor from the evaporator region E to the condensor region C. The heat pipe envelope and thus the vapor duct are evacuated through a port 21 in the closed end 20 of condensor C. Such port is sealed to form the evacuated vapor duct V.

The body of wick W includes a plurality of capillary-sized vessels or passageways adapted to transport working fluid in its liquid state by capillary action at least transversely from lower portions of the wick to upper portions of the wick. The wick may be a felt-like matting of fibers, a sintered powdered or porous ceramic body, or any other suitable porous body which has at least a surface portion which is substantially absorptive of a selected range of the solar spectrum.

For example, as shown in FIGS. 2–5, the wick W may be a felt-like matting of copper fibers which has been oxidized to produce a flat or dulled black surface on the fibers to render them substantially absorptive of radiation in at least a portion of the visible range of the solar spectrum.

The envelope ENV may be made from glass, quartz, sapphire or other material which is substantially transparent with respect to a selected range of the solar spectrum, such as a portion of the visible range of the solar spectrum corresponding to that portion absorbed by the wick W. More particularly, we have found borosilicate glass to be particularly suitable due to its low absorption of light in the visible range (less than 10% reflection and absorption), its high strength and its compatibility with working fluids at high operating temperatures. For example, Corning Glass Works Code 7740 borosilicate glass, sold under the trademark "PYREX", is a suitable glass, as it is highly transparent within the wavelength range of approximately 0.25 to 4.5 micrometers. It should be noted, however, that other types of glass other than boron containing glass may be used to form the envelope. Also laminates of different glasses may be used.

It will be appreciated by those skilled in the heat pipe art that the working fluid is chosen according to its latent heat of vaporization, phase change temperature, surface tension, density, and viscosity, and chemical compatibility. Low viscosity is desired to minimize drag as the fluid moves through the wick. Low density is preferred because the capillary forces generated within the vessels of the wick are offset by the mass of the fluid in such vessels. In order to provide rapid movement of the fluid within the wick, it is of course desired that the working fluid have a high surface tension. The working fluid is chosen to have a latent heat of vaporization such that the heat generated within the wick by the absorption and transformation of solar energy is sufficient to vaporize the fluid. Such vaporization will occur in the desired temperature range of operation with no reaction with the envelope or wick.

Pure or distilled water has been found to be a suitable working fluid when the heat pipe is used to provide heat at temperatures of up to 600° F. For higher working temperatures it may be desirable to choose a working fluid having a higher heat of vaporization. It is not intended that the present invention be limited to any particular working fluid, since the type of working fluid will depend on the temperatures generated within the heat pipe.

The envelope ENV is oriented such that the evaporator region E will receive solar radiation, while the condensor region C is preferably maintained in contact with a heat transfer or heat storage fluid, such as water, air, ethylene glycol-water solution, fused salt, etc. In order to transfer heat, it is only essential that the condensor region C encounter a temperature lower than that of the temperature of the absorptive portion of the wick W within the evaporator region E. As illustrated in FIGS. 2 and 4, solar radiation, represented by rays R, is transmitted through the glass evaporator wall portion of the envelope ENV and is absorbed in at least the outer absorptive surfaces of the fibers of wick W. The absorbed radiation is transformed into heat within the wick, which heat is absorbed by the fluid and causes the fluid to form a vapor. It will be noted that the fluid will be vaporized in the immediate vicinity of where the heat is generated, thus eliminating the heat loss associated with the thermal resistance of the envelope wall and minimizing or eliminating the heat loss associated with the thermal resistance of the wick envelope wall interface.

As the working fluid vaporizes, the pressure within the evaporator region E increases due to the thermal excitation of the molecules which comprise the newly created vapor. The pressure of the vapor sets up a pressure difference between the evaporator region E and the condensor region C, and this pressure difference causes the vapor, and thus the latent heat of vaporization stored therein, to move toward the condensor region C. When the vapor arrives at the condensor region C, it encounters a portion of the wick W and an inner surface portion of the condensor region C of envelope ENV having a temperature lower than that of the corresponding elements within the evaporator region. As a result, the vaporized working fluid condenses and is transformed back to its liquid state and thereby releases the thermal energy stored in its latent heat of vaporization. The heat of condensation released within the condensor region is thereafter transmitted or dissipated outwardly therefrom by thermal conduction through the envelope, as represented by output heat flux arrows Q, into a heat sink or medium surrounding the condensor region.

It should be noted at this point that the drawings are merely illustrative, and that the dimensions of the various elements and relationships between the dimensions is not meant to be exact. When the wick W has a vapor duct V formed within the center thereof, it is desirable to minimize the thickness of the wick so as to minimize drag on vapor flow through the wick. It is also preferable, for example, that the evaporator region E have a length of 4 to 10 feet, and that the outer diameter of the envelope ENV be approximately 1 inch. Such a long slender configuration is suitable for use with known parabolic reflectors, such as those shown in U.S. Pat. Nos. 1,946,148, 2,133,649 and 2,906,257.

Regarding the dimensions of the condensor region C, it will also be appreciated by those skilled in the art of heat pipes that the heat rejection capability of the condensor region is determined by the thermal conductivity, thickness, film coefficients, and surface area of the condensor region and possibly also by any temperature drop associated with the conduction of heat through the wick and from the wick to the envelope wall. The vapor formed in the evaporator region E can be condensed rapidly over a small area or slowly over a large area. In this way, the thermal power available per unit of heat-transfer area can be either increased or decreased. This property of the heat pipe condensor region makes it possible to match the source of heat and a user of such heat. For example, a relatively long tubular condensor region may be inserted into a water storage tank in order to heat the water; in such instance, even though glass has a relatively low thermal conductivity, the heat may be dissipated over a relatively large area of condensor to heat the water.

It will be appreciated that when the envelope is made from glass tubing, it is possible to fabricate such envelopes of great length from a single piece of tubing. That is, in contrast to fabrication from some metals or alloys, it is not necessary to join segments of tubing to form long envelopes, nor is it necessary to employ end caps to hermetically seal the ends of the long tube, as the glass itself may be sealed.

A portion of the heat generated within the wick W by the direct absorption of solar energy will be reradiated and conducted outwardly and will be substantially absorbed within the surrounding portion of the evaporator region or wall portion E. A portion of the absorbed heat will in turn be reradiated or emitted in the infrared portion of the wavelength spectrum, conducted, and convected from the envelope and will be lost into the atmosphere and environment surrounding the evaporator region. To minimize conduction and convection heat losses, the evaporator region E is preferably insulated by a partially evacuated chamber 24 formed by an evacuated tubular glass jacket or envelope 26. The jacket 26 is made from a glass which is also substantially transparent with respect to radiation in a selected range of the solar spectrum, preferably the visible range. It may be also made from borosilicate glass, such as Corning Code 7740 glass.

The tubular jacket 26 may also be cylindrical in shape and either concentric or eccentric with the heat pipe envelope ENV. It has an inner end 28 which is hermetically sealed, preferably by convenient well-known fusion techniques, to an outer surface of the envelope ENV in the vicinity of the juncture between the evaporator and condensor regions E and C, and a closed outer end 30 which is spaced apart from the end 18 of the envelope ENV. The jacket 26 is partially evacuated through a port 32 in the outer end 30 and such port 32 is sealed to form the partially evacuated chamber 24.

When the evaporator region E is of substantial length, one or more spacer elements 34 may be used to support the envelope ENV within the jacket 26. As shown in FIGS. 2 and 3, the spacer 34 may be a resilient spirally wrapped wire having an inner end wrapped around a portion of the outer surface of the envelope ENV and an outer end expanded against an inner surface portion of the jacket 26.

It is well known that glass, depending upon its temperature, will readily emit radiation in a portion of the infrared range. Thus, to minimize radiative or emissive heat losses, the outer surface of the evaporator region E of the envelope ENV is preferably provided with a coating 36 adapted to filter, reflect or shield infrared radiation, but also to permit as much transmission of radiation in the visible portion of the solar spectrum as possible. Of course, coating 36 will reduce the transmission of radiation in the visible regime, but the amount of reflection of infrared radiation will at least compensate thermally for such loss of transmission. A wide variety of infrared reflective coatings, sometimes known as infrared filters or shields "black mirrors" or selective coatings, are known to those skilled in the arts of solar collection and window pane manufacture. A few examples of infrared-reflective coatings suitable for use in the present invention are described in U.S. Pat. Nos. 3,202,054 and 3,505,108 to Mochel, which patents have been assigned to the assignee of the present application. Such an infrared-reflective coating may also be applied to the inner or outer surface of the insulating jacket 26, either in lieu of its application to the outer surface of the envelope ENV or in addition thereto.

The quantity of working fluid is sufficient to at least substantially saturate the wick W. As previously stated, the evaporator region E is preferably relatively long for solar applications and hence, a reflux mode of operation may be used. In such mode, the evaporator region E is inclined downwardly relative to the condensor region C to thereby gravitationally induce flow of the working fluid from the condensor region to the evaporator region. In such mode, the quantity of working fluid is normally greater than that which is needed to fully saturate the wick W. In operation, a substantial portion of the condensed working fluid flows through a lower portion of the envelope from the condensor region into the evaporator region, and thereafter is transported in all directions, including upwardly in a direction transverse to the axis of the tubular envelope, by means of capillary action within the wick.

While the envelope ENV of the solar heat pipe of the present invention has been described as including an evaporator region or wall portion E and a condensor region or wall portion C, those skilled in the heat pipe art will realize that the two regions may be separated by an interconnecting vapor transport region or wall portion. A vapor transport region provides for the communication of vaporized working fluid generated in the evaporator region to the condensor region and also for the communication of condensed working fluid in the opposite direction. A vapor transport region may be formed at an annular portion of the envelope ENV at a location either contiguous with or adjacent the juncture of the envelope ENV and the inner end 28 of the insulating jacket 26. Insofar as a wide variety of means for coupling the heat pipe of the present invention to manifolds will be apparent to those skilled in the heat pipe art, it is not intended that this invention be limited to the use of any particular coupling means and the locations of the vapor transport regions associated with such coupling means.

Figure 5:
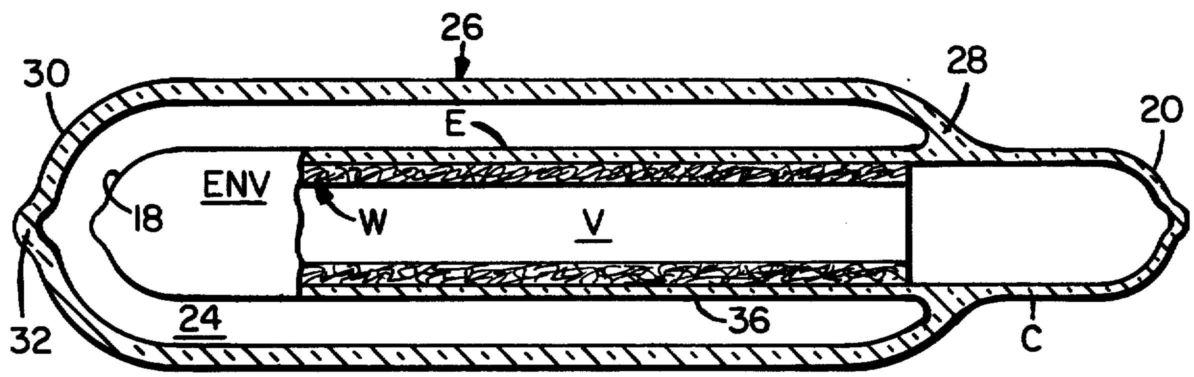
FIG. 5 is a side elevational view in partial crosssection of another preferred embodiment of the improved solar heat pipe of the present invention.

As illustrated in FIG. 5, another preferred embodiment of the present invention includes a wick W which extends from near the outer end 18 of the evaporator region E to a location near the juncture of the insulating jacket 26 and the envelope ENV. That is, the wick W lies more or less wholly within the evaporator region E and does not extend into the condensor region C. This embodiment entails a reflux mode of operation wherein the condensor region C is elevated relative to the evaporator region E to gravitationally induce flow of working fluid from the condensor region into the evaporator region. It will be appreciated that the vapor flowing from the evaporator region E condenses directly on the inner surface of the wall portion of the envelope forming the condensor region C.

Figure 6:
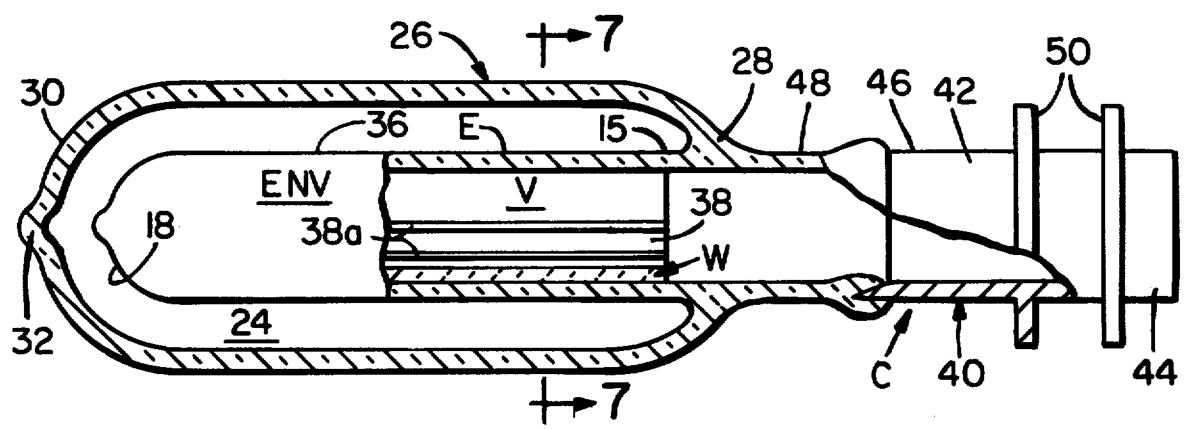
FIG. 6 is a side elevational view in partial cross section of yet another preferred embodiment of the invention.
Figure 7:
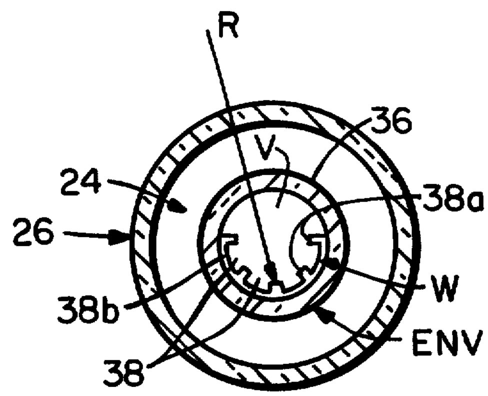
FIG. 7 is a sectional view taken on line 7—7 of FIG. 6.

FIGS. 6 and 7 illustrate yet another embodiment of the improved solar heat pipe of the present invention, wherein the wick W is made from a porous ceramic material having longitudinally extending arterial passageways or troughs 38 formed on an inner surface thereof, and the condensor region C is provided with a tubular end section 40 made from a material which has a high thermal conductivity. The wick W is contained within a vacuum-insulated evaporator region E of envelope ENV; that is, the wick W does not extend into the condensor region C. Hence, the embodiment of the heat pipe shown in FIGS. 6 and 7 also entails a reflux mode of operation, wherein the working fluid condensed within the evaporator region C is gravitationally induced to flow in the direction of the evaporator region E and the condensed fluid is transported at least transversely through the evaporator region E by means of capillary action within the wick W.

The wick W may have semi-cylindrical outer and inner contours, and an outer radius only slightly less than the minimum inner radius of the envelope ENV. An inner surface of the wick W and an opposing upper section of the envelope ENV together form the vapor duct V; and solar radiation, as represented by ray R in FIG. 7, is transmitted through an upper section of the evaporator wall portion E of the envelope ENV and is absorbed in the inner surface of the wick W which is adapted to absorb solar radiation. It is possible to make the glass section of the envelope ENV from glass tubing drawn by high speed production processes, which processes may produce a non-uniform internal diameter. Also, the wick W may be inexpensively made from extruded or laid-up, hollowed porous ceramic logs or slabs which may also have wide tolerances of cross-sectional dimensions.

To provide even distribution of the gravitationally induced flow of working fluid, the wick W preferably has one or more arterial passageways or troughs 38 formed in the inner surface thereof which longitudinally extend from one end of the wick to its other end. The arterial passageways 38 are separated from each other by porous radially extending wall portions or ribs **38*a* and are defined at their radially outer extents by porous semi-cylindrical wall portions 38*b***.

The following example of a ceramic wick is hereby given to merely illustrate a preferred embodiment of the improved heat pipe of the present invention, and hence should not be construed as limiting the invention. An extruded monolithic ceramic substrate of cylindrical form was made from a cordierite ceramic mixture according to the process described in U.S. Pat. No. 3,790,654 to Bagley, which is assigned to the assignee of this application. The substrate had a multicellular or honeycombed structure. In particular, the multicellular ceramic substrate may be that sold by Corning Glass Works under the description, Code 9475 (EX-20). The Code 9475 substrate is particularly useful due to its permeability coefficient (approximately $3.5 \times 10^{-7}$ cm.$^2$) and its wicking height (approximately $7.6 \times 10^{-7}$ cm. for water at 24° C.). To render the substrate absorptive of radiation in at least the visible range of the solar spectrum, the Code 9475 cordierite substrate was soaked in a solution of India Ink obtained from the Higgins Company and a small amount of lamp carbon (1 to 5 percent by weight). The substrate was thereafter heated or baked at approximately 300° C. for 1 hour. A generally cylindrical bore may then be formed in the substrate by boring and reaming a hole through the center of the substrate. The bore will be large enough to leave essentially only an outer or circumferential wall and a plurality of longitudinally extending ribs **38*a*** projecting radially inwardly therefrom. The substrate may thereafter be sawed in half to provide the semicylindrical wick which has just been described. It will be appreciated such a ceramic wick may be extruded generally according to the process of U.S. Pat. No. 3,790,654.

The working fluid chosen for use with the radiation absorptive ceramic wick was again pure water. It will be understood that other working fluids may be used, depending on the operating temperature range of the heat pipe.

The highly conductive tubular end section 40 is preferably made from metal, such as copper, and includes a hollow tubular core 42 having a closed outer end 44 and an open inner end 46. The inner end 46 is connected by a suitable glass-to-metal seal, such as the well-known Housekeeper seal, to an open end 48 of a tubular envelope made from glass. That is, the envelope ENV of the illustrated embodiment has an evaporator region E made from a material which is substantially transparent with respect to visible light, and which extends a selected distance from the outer end 18 of the envelope ENV toward the open end 48 thereof, and a tubular close-ended highly conductive section 40 connected to the open end 48. The condensor region C of the envelope ENV includes at least the highly conductive end section 40 and may also include an end portion of the glass section lying between section 40 and evaporator region E. The envelope ENV may be evacuated through a vacuum pinch-off or port (not shown) which extends outwardly from the outer end 44 of the tubular end section 40; and after supplying the envelope with a selected quantity of working fluid, the port may be welded, brazed, or soldered to form a hermetically sealed envelope.

The highly conductive end section 40 is preferably provided with a plurality of fins or ribs 50 adapted to increase the active heat transfer area of the condensor region C. Such a fin structure is particularly useful in applying heat to a dynamic heat transfer medium within a manifold system.

It will be appreciated that the wick and envelope may have forms other than those described above. For example, the envelope ENV may have a flattened or irregular cross-sectional shape. The wick W need not be cylindrical in shape; it may be of any suitable shape adapted to receive radiation transmitted through either all, or a section, of the evaporator wall portion E of the envelope ENV. The wick may be flat, star-shaped, oval, or irregularly shaped. There is no necessity that the vapor duct be formed in an interior portion of the wick; the vapor duct may be disposed between an inner surface portion of the evaporator region of the envelope and an outer surface portion of the wick, within the wick, or within the wick and also between the wick and envelope wall. Also, the envelope may have a condensor region having a tubular end section which is flattened to accommodate a rectangular heat transfer fluid manifold cross section.

The invention may be embodied in other specific forms without departing from the spirit or essential characteristics thereof. The embodiments described above are therefore to be considered in all respects as illustrative and not restrictive.

We claim:

1. Solar heat pipe apparatus comprising a hermetically sealed envelope having an evaporator region for receiving solar radiation and a condensor region for transferring heat therefrom, a quantity of vaporizable working fluid within said envelope, wick means within said envelope for transporting said working fluid, at least the evaporator region of said envelope having wall portions substantially transparent with respect to radiation in a selected range of the solar spectrum whereby such radiation is transmittable through such wall portions of said evaporator region, said wick means having a surface portion which is substantially absorptive of radiation in at least a portion of said selected range of the solar spectrum, said absorptive surface portion of said wick means being positioned within said envelope adjacent the inner surface of said substantially transparent wall portions to receive and absorb radiation transmitted through such wall portions of the evaporator region whereby solar radiation is converted into heat within said absorptive surface portion for evaporating working fluid in said wick means, a vapor duct surrounded by said wick means for directing the movement of the vaporized working fluid from said evaporator region to said condensor region, said condensor region having wall portions for condensing said vaporized working fluid and for transferring heat therefrom, and evacuated, at least partially transparent, container means surrounding said evaporator region for thermally insulating the wall portions of the evaporator region from the ambience.

2. Solar heat pipe apparatus as defined in claim 1 wherein said envelope comprises a tubular glass body having closed first and second ends, said wall portions of said evaporator region extending from said first end a predetermined distance toward said second end, wall portions of said condensor region extending a selected distance from said second end toward said evaporator wall portions, and said container means comprising tubular glass jacket means hermetically sealed to a surface portion of said envelope lying between said evaporator and condensor wall portions for insulating said evaporator wall portions.

3. Solar heat pipe apparatus as defined in claim 1 wherein said hermetically sealed envelope includes a tubular glass section having a closed end and an open end, and a tubular metal section having an open end hermetically sealed to said open end of said tubular glass section and a closed end; said evaporator wall portions extending a selected distance from the closed end of said glass section toward said open end thereof, said condensor region including at least said metal section of the envelope; finned means provided on said metal section for transmitting heat therefrom; and said container means comprising tubular glass jacket means hermetically sealed to said tubular glass section of said envelope for insulating said evaporator wall portions.

4. A heat pipe device for converting solar energy into thermal energy comprising;

a hermetically sealed, elongated envelope having first and second closed ends;

a quantity of vaporizable working fluid within said envelope;

wick means longitudinally disposed within said envelope for transporting said working fluid by capillary action, said wick means contiguous with an inner surface portion of said envelope and extending a predetermined distance from near the first closed end toward the second closed end of said envelope;

said wick means having a surface portion adjacent said inner surface portion of said envelope which is substantially absorptive of radiation in at least a portion of the visible range of the solar spectrum;

said envelope having an evaporator wall portion which is substantially transparent with respect to at least the portion of the visible range of the solar spectrum substantially absorbed by said surface portion of said wick means, whereby radiation transmitted through said substantially transparent wall portion is absorbed within said absorptive surface portion of said wick means to generate heat within said wick means and evaporate working fluid contained therein;

said envelope having a condensor wall portion oriented to transfer heat therefrom to an external medium;

vapor duct means extending longitudinally within said envelope for directing the vaporized working fluid formed by the heat generated within said wick means toward said condensor wall portion, wherein said vaporized working fluid condenses within said condensor wall portion and releases its heat of vaporization for transfer through said condensor wall portion to said medium, with the condensed working fluid transported by said wick means back to said absorptive surface portion of said wick means within said evaporator wall portion;

and evacuated substantially transparent jacket means hermetically sealed to said envelope for insulating said evaporator wall portion.

5. A heat pipe device as defined in claim 4 wherein said wick means is wholly disposed within said evaporator wall portion of said envelope, and said condensor wall portion of said envelope is inclined relative to said evaporator wall portion to cause condensed working fluid to flow from inner surface portions of said condensor wall portion into said wick means.

6. A heat pipe device as defined in claim 4 wherein said envelope and said jacket means are made of glass, and film means is applied to an outer surface of said evaporator wall portion of said envelope for reflecting heat emitted from said evaporator wall portion toward said wick means.

* * * * *